United States Patent
Song et al.

(10) Patent No.: US 8,279,371 B2
(45) Date of Patent: Oct. 2, 2012

(54) OPTICAL PLATE, METHOD OF MANUFACTURING THE SAME, AND LIQUID CRYSTAL DISPLAY DEVICE HAVING THE SAME

(75) Inventors: Min-young Song, Seoul (KR); Jin-soo Kim, Seoul (KR); Byung-yun Joo, Seoul (KR); Ju-hwa Ha, Seoul (KR); Jung-wook Paek, Suwon-si (KR); Jin-sung Choi, Cheonan-si (KR); Sang-hoon Lee, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 765 days.

(21) Appl. No.: 11/670,134

(22) Filed: Feb. 1, 2007

(65) Prior Publication Data

US 2008/0037272 A1 Feb. 14, 2008

(30) Foreign Application Priority Data

Feb. 1, 2006 (KR) .................. 10-2006-0009743

(51) Int. Cl.
*G02F 1/1335* (2006.01)
(52) U.S. Cl. ............................. 349/65; 349/64
(58) Field of Classification Search .............. 349/61–71, 349/95; 362/561
See application file for complete search history.

(56) References Cited

U.S. PATENT DOCUMENTS

| | | | | | |
|---|---|---|---|---|---|
| 5,126,882 | A | * | 6/1992 | Oe et al. .......... | 359/619 |
| 5,396,350 | A | * | 3/1995 | Beeson et al. ........ | 349/62 |
| 5,889,084 | A | * | 3/1999 | Roth .................... | 523/161 |
| 6,275,338 | B1 | * | 8/2001 | Arai et al. ........... | 359/599 |
| RE38,305 | E | * | 11/2003 | Gunjima et al. ......... | 349/9 |
| 6,919,991 | B2 | * | 7/2005 | Koyama ............... | 359/619 |
| 7,042,644 | B2 | * | 5/2006 | Nishikawa .......... | 359/619 |
| 7,349,039 | B2 | * | 3/2008 | Lee et al. ............ | 349/57 |
| 2003/0206256 | A1 | * | 11/2003 | Drain et al. ............ | 349/113 |
| 2004/0246403 | A1 | * | 12/2004 | Kim et al. ........... | 349/65 |
| 2006/0077688 | A1 | * | 4/2006 | Uehara et al. .......... | 362/613 |
| 2007/0252923 | A1 | * | 11/2007 | Hwang et al. .......... | 349/65 |

FOREIGN PATENT DOCUMENTS

| | | |
|---|---|---|
| JP | 10-115714 | 5/1998 |
| JP | 1998-160914 | 6/1998 |
| JP | 2001-338507 | 12/2001 |
| JP | 2002-049031 | 2/2002 |
| JP | 2004-111170 | 4/2004 |
| JP | 2004-325861 | 11/2004 |
| KR | 1020050034248 | 4/2004 |
| KR | 1020050088905 | 9/2005 |

OTHER PUBLICATIONS

English Abstract for Publication No.: 10-115714.
English Abstract for Publication No.: 2004-325861.
English Abstract for Publication No.: 1020050034248.

* cited by examiner

*Primary Examiner* — Thanh-Nhan P. Nguyen
(74) *Attorney, Agent, or Firm* — F. Chau & Associates, LLC

(57) ABSTRACT

A method of manufacturing an optical plate, includes forming a protrusion on a base film by jetting ink containing a liquid resin on the base film, contacting a light guiding plate to the protrusion, and curing the protrusion which contacts with the light guiding plate.

23 Claims, 11 Drawing Sheets

OPTICAL PLATE, METHOD OF MANUFACTURING THE SAME, AND LIQUID CRYSTAL DISPLAY DEVICE HAVING THE SAME

CROSS-REFERENCE TO RELATED APPLICATIONS

This application claims the benefit of Korean Patent Application No. 2006-0009743, filed on Feb. 1, 2006, the disclosure of which is hereby incorporated by reference herein in its entirety.

BACKGROUND OF THE INVENTION

1. Technical Field

The present disclosure relates to an optical plate, a method of manufacturing the optical plate, and to a liquid crystal display device having the optical plate.

2. Description of the Related Art

Fiat panel displays such as, for example, liquid crystal displays (LCDs), plasma display panels (PDPs) and organic light emitting diodes (OLEDs) have been developed to replace cathode ray tubes (CRTs).

For example, an LCD typically includes a liquid crystal display panel including a thin film transistor substrate, a color filter substrate, and a liquid crystal layer which is interposed between the thin film transistor substrate and the color filter substrate. As the liquid crystal display panel does not emit light by itself, a backlight unit may be disposed behind the thin film transistor substrate to emit light. The amount of the transmittance of light from the backlight unit is controlled depending on an alignment of liquid crystals in the liquid crystal layer.

The backlight unit is classified into an edge type and a direct type according to the position of the light source. For example, the edge type backlight unit has a structure where the light source is provided at a lateral side of a light guiding plate, and is mainly employed in a small-sized liquid crystal display device such as a laptop or desktop computer. The edge type backlight unit has good light uniformity, durability and also occupies a small space in the LCD.

In the edge type backlight unit, the light guiding plate is used to guide light from the lateral side thereof to the liquid crystal display panel. Also, a plurality of optical sheets are provided between the light guiding plate and the liquid crystal display panel to collect and diffuse light from the light guiding plate.

However, the conventional backlight unit requires the light guiding plate and the plurality of optical sheets to be separate, thereby causing a complex configuration and increasing production costs.

SUMMARY OF THE INVENTION

Accordingly, the exemplary embodiments of the present invention provide an optical plate which guides and collects light at the same time, and a method of manufacturing the optical plate.

Also, the exemplary embodiments of the present invention provide a liquid crystal display device which comprises an optical plate to guide and collect light at the same time.

In accordance with exemplary embodiments of the present invention, a method of manufacturing an optical plate is provided. The method includes forming a light collecting pattern on a base film by jetting ink containing a liquid resin on the base film, contacting a light guiding plate to the light collecting pattern, and curing the light collecting pattern which contacts with the light guiding plate.

According to exemplary embodiments of the present invention, the liquid resin comprises an ultraviolet (UV) curing resin, and the light collecting pattern is cured by ultraviolet rays.

According to exemplary embodiments of the present invention, the contacting of the light collecting pattern to the light guiding plate is made in a state where the light guiding plate is located on the base film.

According to the exemplary embodiments of the present invention, the light collecting pattern is cured in a state where the light guiding plate is located on the base film.

According to the exemplary embodiments of the present invention, the light collecting pattern has a stripe shape.

According to the exemplary embodiments of the present invention, the light collecting pattern is provided to be plural in number. The plurality of light collecting pattern are disposed in parallel with each other.

According to the exemplary embodiments of the present invention, the cured light collecting pattern has a larger contact area with the base film than that with the light guiding plate.

According to the exemplary embodiments of the present invention, the base film comprises a plurality of light diffusing beads.

According to the exemplary embodiments of the present invention, the light collecting pattern is provided as a dot pattern.

In accordance with an exemplary embodiment of the present invention, an optical plate is provided. The optical plate includes a light guiding plate, a base film which is located on the light guiding plate, and a light collecting pattern partially connecting the light guiding plate to the base film and having a larger contact area with the base film than that with the light guiding plate.

According to the exemplary embodiments of the present invention, the light collecting pattern comprises an ultraviolet (UV) curing resin.

According to the exemplary embodiments of the present invention, the light collecting pattern has a stripe shape and is provided to be plural in number. The plurality of light collection patterns are disposed in parallel with each other.

According to the exemplary embodiments of the present invention, the base film comprises a plurality of light diffusing beads.

According to the exemplary embodiments of the present invention, the light collecting pattern is provided as a dot pattern.

In accordance with an exemplary embodiment of the present invention a liquid crystal display device is provided. The liquid crystal display includes a liquid crystal display panel and an optical plate which is provided in the rear of the liquid crystal display panel. The optical plate includes a light guiding plate, a base film provided on the light guiding plate and a light collecting pattern partially connecting the light guiding plate to the base film and having a larger contact area with the base firm than that with the light guiding plate. The liquid crystal display further includes a light source which is provided on at least a lateral side of the light guiding plate.

According to the exemplary embodiments of the present invention, the light collecting pattern comprises an ultraviolet (UV) curing resin.

According to the exemplary embodiments of the present invention, the light collecting pattern is of a stripe type and is provided to be plural in number. The plurality of light collecting patterns are in parallel with each other.

According to the exemplary embodiments of the present invention, the light source is disposed in parallel with an extension direction of the light collecting pattern.

According to the exemplary embodiments of the present invention, the base film comprises a plurality of light diffusing beads.

BRIEF DESCRIPTION OF THE DRAWINGS

Exemplary embodiments of the present invention can be understood in further detail from the following detailed description taken in conjunction with the accompanying drawings of which.

DETAILED DESCRIPTION OF THE EXEMPLARY EMBODIMENTS

Hereinafter, exemplary embodiments of the present invention will be described with reference to accompanying drawings, wherein like numerals refer to like elements and repetitive descriptions will be avoided as necessary.

A liquid crystal display (LCD) device according to a first exemplary embodiment of the present invention will be described with reference to FIGS. 1 and 2.

Figure 1:
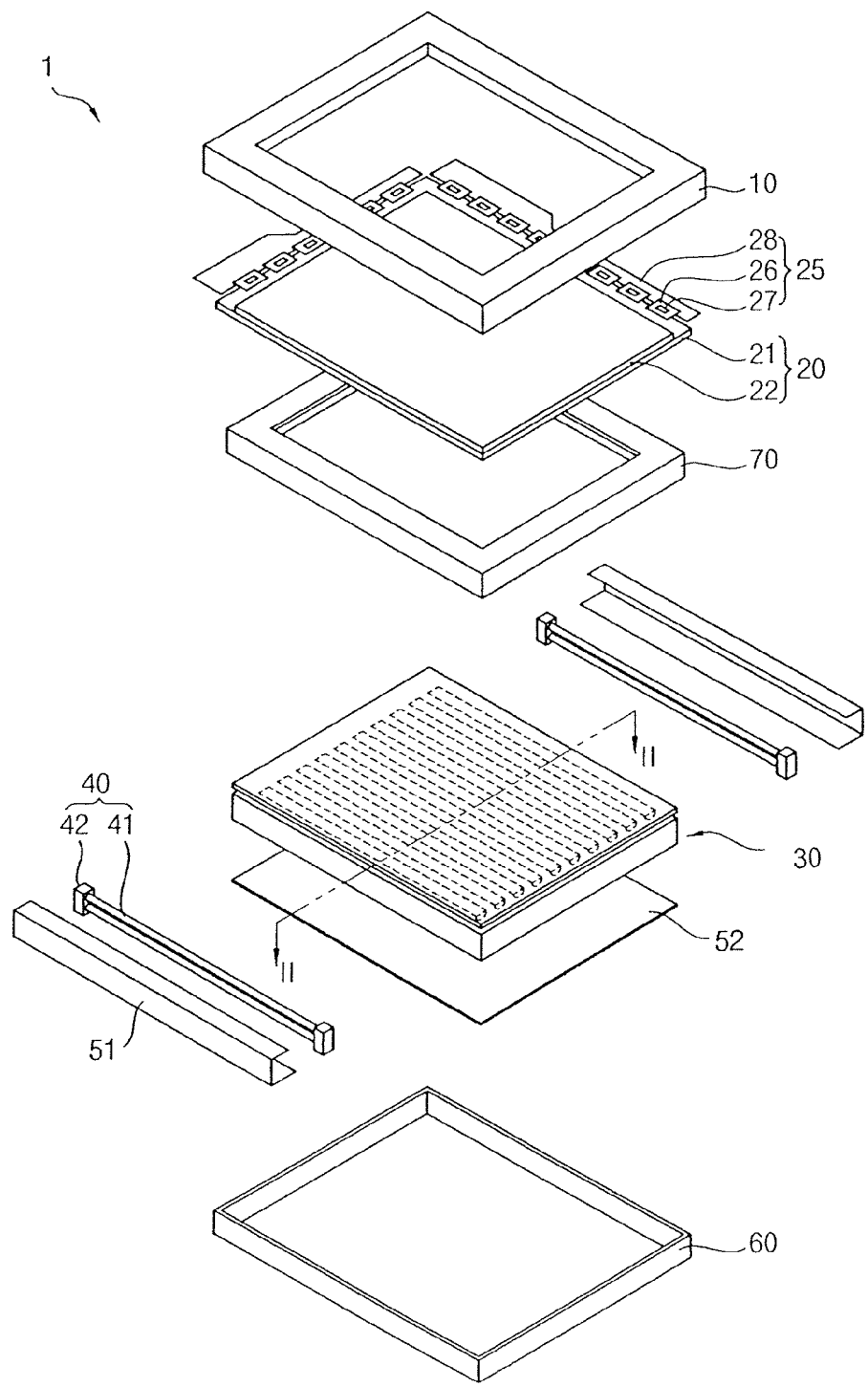
FIG. 1 is an exploded perspective view of a liquid crystal display (LCD) device according to an exemplary embodiment of the present invention.
Figure 2:
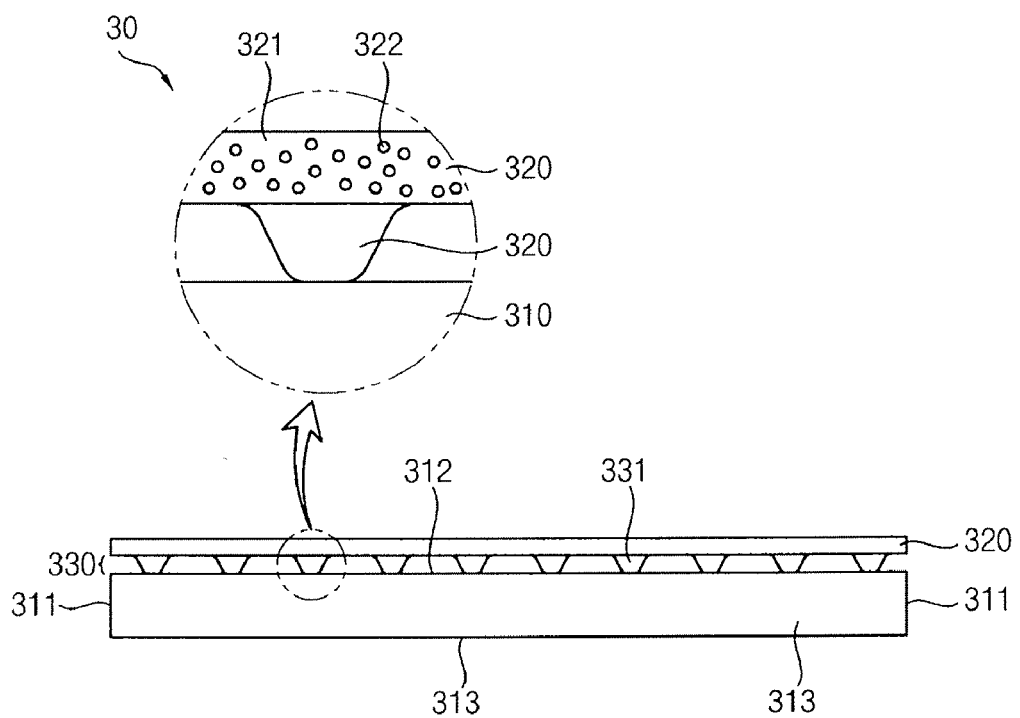
FIG. 2 is a sectional view taken along line II-II in FIG. 1.

Referring to FIGS. 1 and 2, an LCD device 1 comprises an LCD panel 20, an optical plate 30 which is provided in rear of the LCD panel 20, a pair of light sources 40 which are provided in opposite sides of the optical plate 30, a light source cover 51 which covers the light sources 40, and a reflection plate 52 which is provided on a lower part of the optical plate 30. The foregoing elements are accommodated between an upper casing 10 and a lower casing 60. The LCD panel 20 is stably seated on a mold 70.

The LCD panel 20 comprises a thin film transistor substrate 21 on which thin film transistors are formed, and a color filter substrate 22 facing the thin film transistor substrate 21. A liquid crystal layer is provided between the thin film transistor substrate 21 and the color filter substrate 22. The LCD panel 20 displays an image by adjusting the alignment of liquid crystals in the liquid crystal layer. The LCD panel 20 receives light from the light sources 40 as it does not emit light by itself. A driver 25 is provided on a lateral side of the thin film transistor substrate 21 to supply a driving signal. The driver 25 comprises a flexible printed circuit board (FPC) 26, a driving chip 27 which is mounted on the FPC 26, and a printed circuit board (PCB) 28 which is connected to a lateral side of the FPC 26. The driver 25 is of a chip on film (COP) type, but not limited thereto. Alternatively, the driver 25 may comprise other known types such as, for example, a top carrier package (TCP) or chip on glass (COG). The driver 25 may be mounted on the thin film transistor substrate 21.

The optical plate 30 which is provided in the rear of the LCD panel 20 comprises a light guiding plate 310, a base film 320, and a light collecting layer 330. The base film 320 faces the LCD panel 20, and the light guiding plate 310 faces the reflection plate 52. The light collecting layer 330 is provided between the light guiding plate 310 and the base film 320 to connect them to each other.

The light guiding plate 310 guides light incident into an incident surface 311 to the LCD panel 20 through an emission surface 312. The light guiding plate 310 changes linear light to surface light. For example, the light guiding plate 310 may comprise an acrylic resin such as polymethyl methacrylate (PMMA). Various patterns may be formed on a reflection surface 313 of the light guiding plate 310 facing the reflection plate 52, to reflect light toward the LCD panel 20. The patterns may include, for example, a dot pattern, a V-cut groove pattern, a prism pattern or the like.

The base film 320 faces the emission surface 312 of the light guiding plate 310 and is disposed in parallel to the emission surface 312. The base film 320 comprises a base resin part 321 which comprises transparent resin, and light diffusing beads 322 which are diffused within the base resin part 321. The base resin part 321 may comprise, for example, a polycarbonate resin or a poly vinyl chloride resin, which is preferably but not necessarily transparent.

The light diffusing beads 322 may comprise a material which has a refractive index different from that of the base resin part 321. The light diffusing beads 322 may comprise, for example, polyethyleneterephthalate (PET). The light from the emission surface 321 of the light guiding plate 310 is incident into the base film 320 directly or via the light collecting layer 330. The light diffusing beads 322 of the base film 320 diffuses the incident light to be supplied to the LCD panel 20.

The light collecting layer 330 is provided between the emission surface 312 of the light guiding plate 310 and the base film 320. The light collecting layer 330 comprises a plurality of light collecting patterns 331 which are disposed in parallel at predetermined, intervals. The light collecting patterns 331 have a stripe type and are disposed in an extension direction of the light sources 40.

The contact area of the light collecting patterns 331 with the base film 320 is larger than that of the light collecting patterns 331 with the light guiding plate 310. This is because the light collecting patterns 331 are formed on the base film 320 through an inkjet method, which will be described later in detail. A transverse section of the light collecting patterns 331 may have a semicircular shape depending on a production process.

The light collecting patterns 331 comprise, for example, a thermosetting resin, an ultraviolet (UV) curing resin or an electron beam curing resin. The foregoing resins are cured through a cross-linking reaction when heated with ultraviolet rays and electron beams.

For example, the UV curing resin comprises an acryl a urethane resin, a UV curing polyester acrylate resin, a UV curing epoxy acrylate resin, a UV curing polyol acrylate resin, a UV curing epoxy resin or the like.

The light collecting patterns 331 may further comprise a photoinitiator which is activated by ultraviolet rays and initiates polymerization or a cross-linking reaction.

A pair of light sources 40 are disposed on the emission surface 311 of the light guiding plate 310. The extension direction of the light sources 40 is in parallel with that of the light collecting patterns 331. The light sources 40 each comprise a lamp main body 41, and lamp holders 42 which are provided on opposite ends of the lamp main body 41. The lamp holders 42 have a hexahedron shape. The lamp holders 42 surround electrode parts which are disposed on the opposite ends of the lamp main body 41, and are made of plastic. The light sources 40 may comprise, for example, a cold cathode fluorescent lamp (CCFL) or an external electrode fluorescent lamp (EEFL). Alternatively, the light sources 40 may comprise, for example, a light emitting diode (LED).

The light source cover 51 covers the light sources 40 to reflect light from the light sources 40 toward the emission surface 311 of the light guiding plate 310. The light source cover 51 may comprise, for example, an aluminum plate or a cine coated plate.

The reflection plate 52 is provided on the lower part of the light guiding plate 310 and reflects light toward the reflection surface 313 of the light guiding plate 310. For example, the reflection plate 52 may comprise plastic such as polyethyleneterephthalate (PET) or polycarbonate (PC).

Figure 3:
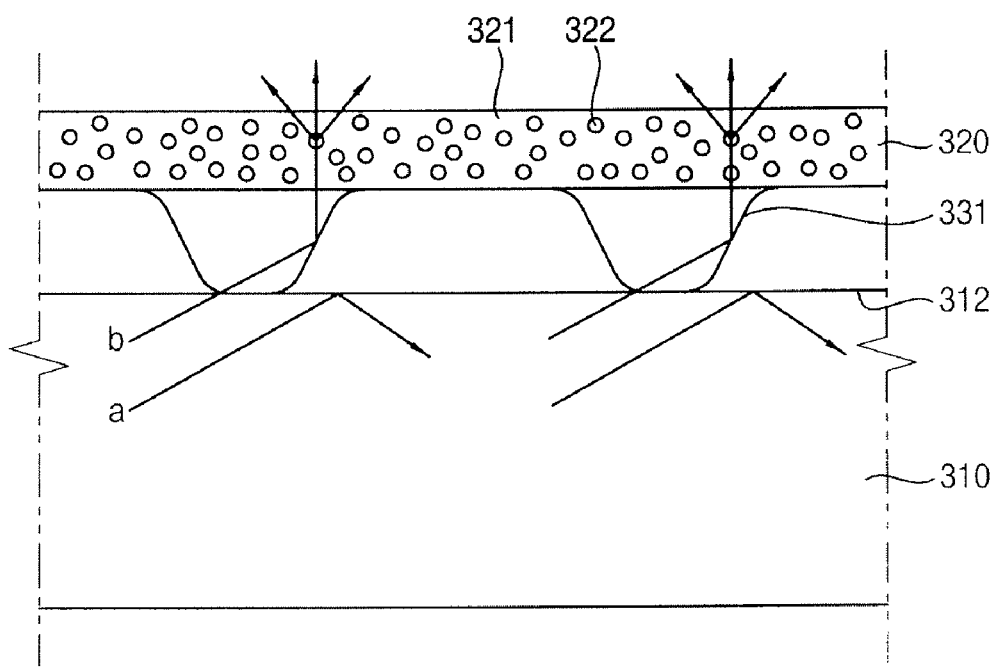
FIG. 3 illustrates a path of light on an optical plate according to an exemplary embodiment of the present invention.

The path of light on the light guiding plate 310 according to the first exemplary embodiment of the present invention will be described with reference to FIG. 3.

Light which is incident from the light sources 40 into the incident surface 311 of the light guiding plate 310 is totally reflected in the light guiding plate 310 or emitted through the emission surface 312 of the light guiding plate 310.

The emission surface 312 of the light guiding plate 310 according to exemplary embodiments of the present invention is partially connected with the light collecting patterns 331.

Light (a) which is incident into a portion of the emission surface 312 that is not connected with the light collecting patterns 331 is totally reflected to return to the light guiding plate 310. Only when an incident angle to the emission surface 312 is smaller than a critical angle, may the total reflection be generated. When the incident angle is larger than the critical angle, light is emitted through the emission surface 312.

Light (b) which is incident into the emission surface 312 that is connected with the light collecting patterns 331 travels inside the light collecting patterns 331. The light (b) which travels inside the light collecting patterns 331 is reflected on a lateral side of the light collecting patterns 331. The traveling direction of the light (b) is changed to a direction perpendicular to the LCD panel 20 by the reflection.

Some of the light whose traveling direction is changed is diffused by the light diffusing beads 322 of the base film 320 to be supplied to the LCD panel 20.

In this manner, the light from the light sources 40 is changed from the linear light to the surface light, collected and diffused while passing through the light guiding plate 30. Some or all of optical films which have been conventionally used in the art can be omitted by employing the optical plate 30 according to exemplary embodiments of the present invention.

Hereinafter, a simulation result for an optical plate will be described with reference to FIGS. 4a to 5c.

Figure 4A:
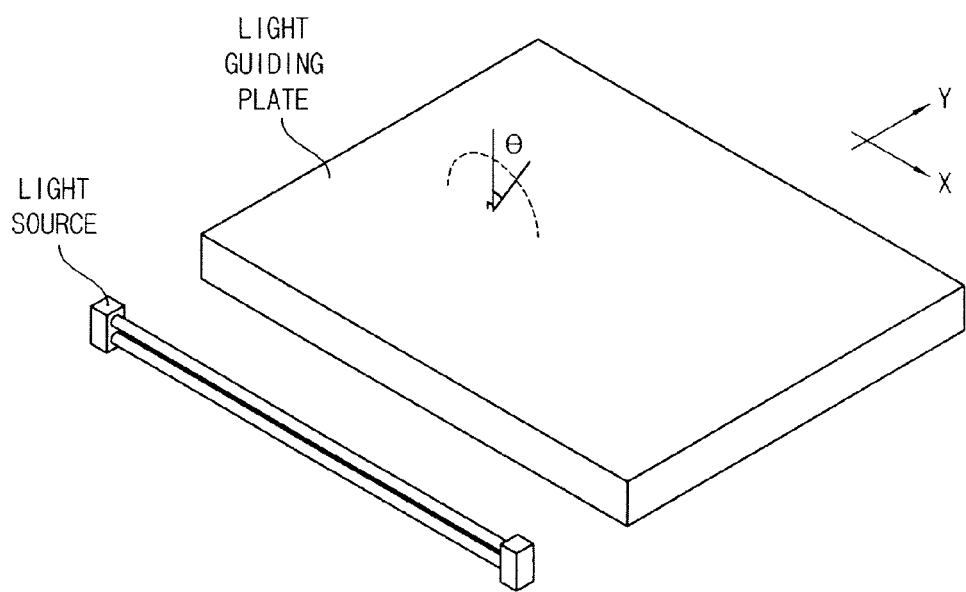
FIGS. 4a to 5c illustrate a simulation result for the path of light on the optical plate according to an exemplary embodiment of the present invention.
Figure 4B:
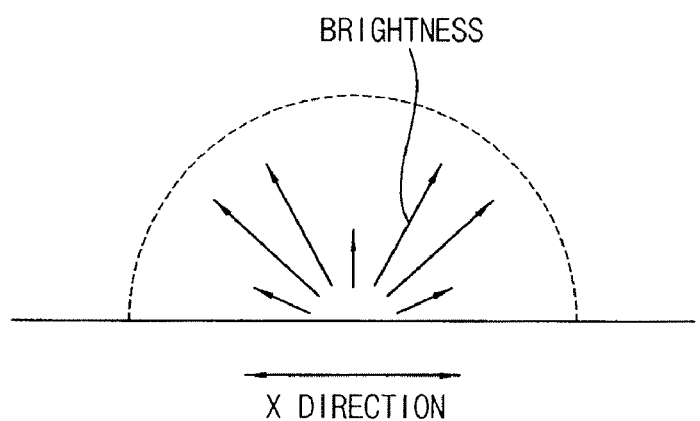
Figure 4C:
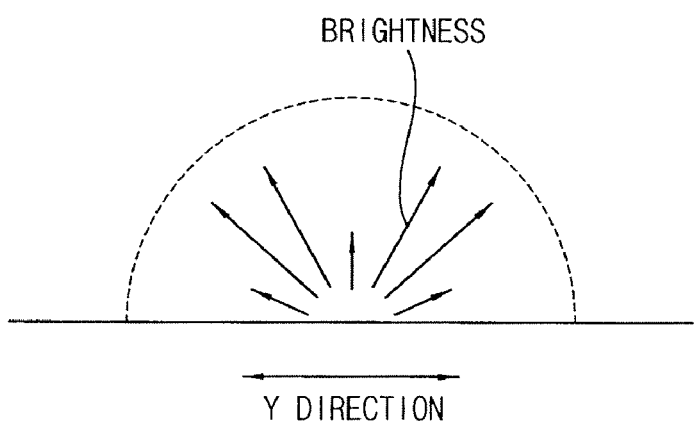
Figure 5A:
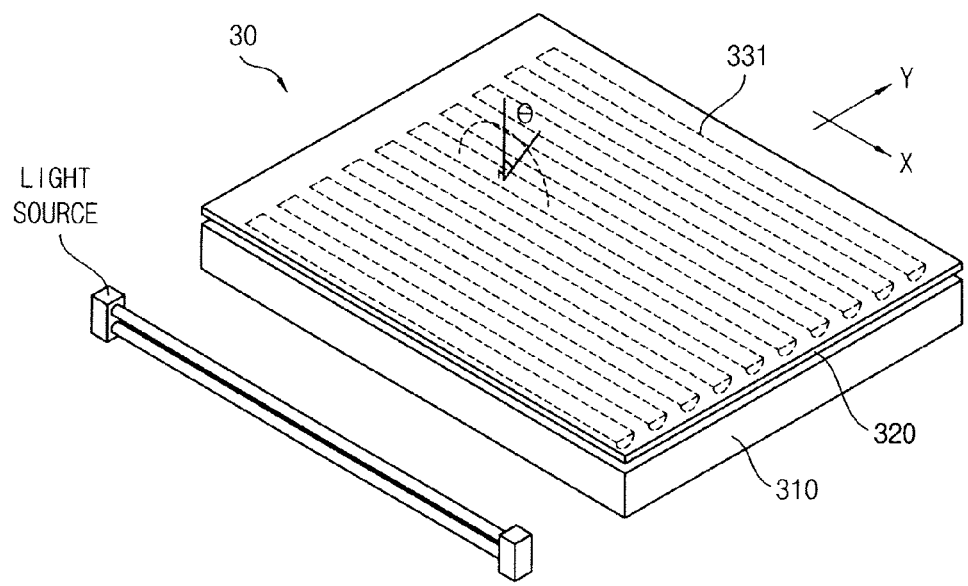
Figure 5B:
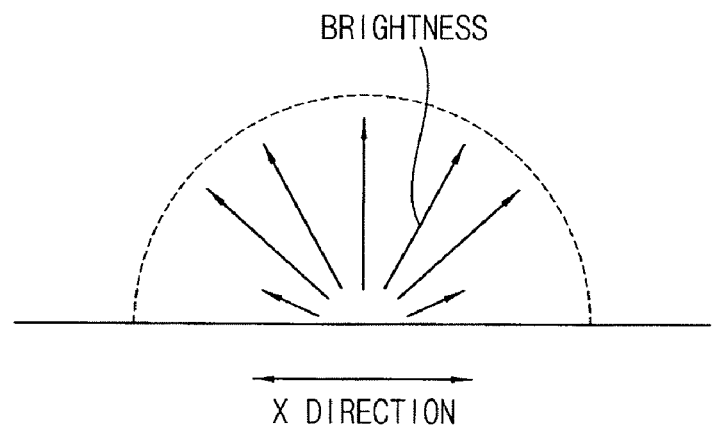
Figure 5C:
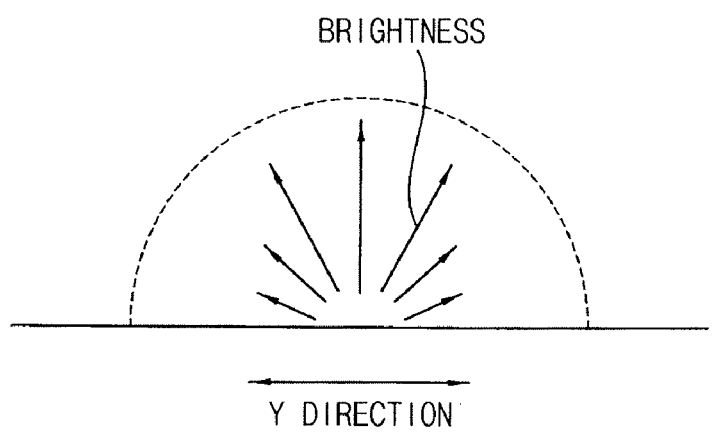

FIGS. 4a to 4c illustrate a simulation result when a conventional light guiding plate having a dot pattern on a reflection surface is used. FIGS. 5a to 5c illustrate a simulation result when the optical plate 30 according to the first exemplary embodiment of the present invention is used.

First, the simulation result for the conventional light guiding plate will be described Referring to FIGS. 4a to 4c.

As shown in FIG. 4a, a light source is provided at a lateral side of the conventional light guiding plate, and a virtual hemisphere is formed on an emission surface of the light guiding plate. The center of the hemisphere is on the emission surface of the light guiding plate. Under such conditions, a brightness distribution formed on a surface of the hemisphere by the light emitted from the center of the hemisphere is calculated.

FIGS. 4b and 4c illustrate brightness changes in x and y directions in FIG. 4a. The x direction is in parallel with the arrangement of the light sources, and the y direction is perpendicular to the arrangement of the light sources.

As shown in FIG. 4b showing the brightness in the x direction, the brightness is low in vertical and horizontal directions and high in a lateral direction.

The brightness of the y direction in FIG. 4c has the same pattern as but different absolute magnitudes from that of the x direction.

That is, the conventional light guiding plate provides higher brightness in the lateral direction than in the vertical direction. Accordingly, the conventional light guiding plate requires an additional optical film such as a prism film to improve front brightness.

Referring to FIGS. 5a to 5c, a brightness distribution on the surface of the hemisphere, centering on a predetermined point of the base film 320, is calculated. Light is supplied to the surface of the hemisphere from the light guiding plate 310, the light collecting patterns 331 and the base film 320.

The simulation type is the same as that of the conventional light guiding plate in FIGS. 4a to 4c.

FIGS. 5b and 5c illustrate brightness changes in the x and y directions in FIG. 5a. The x direction is in parallel with the arrangement of the light sources and the light collecting patterns 331. The y direction is perpendicular to the arrangement of the light source.

As shown in FIG. 5b showing the brightness in the x direction, the brightness is low in a horizontal direction, and nigh in vertical and lateral directions.

As shown in FIG. 5c showing the brightness in the y direction, the brightness is high in the vertical direction alone, and low in the horizontal and lateral directions.

That is, the light guiding plate 310 according to exemplary embodiments of the present invention provides high brightness in the vertical direction without requiring an additional optical film such as a prism film.

Hereinafter, a manufacturing method of the optical plate according to the first exemplary embodiment of the present invention will be described with reference to FIGS. 6a to 6d. FIG. 6b is a sectional view taken along line VIb-VIb in FIG. 6a.

Figure 6A:
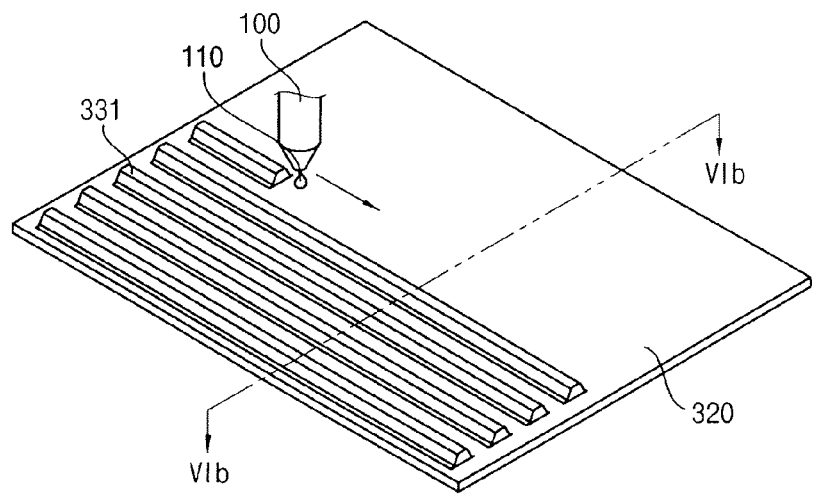
FIGS. 6a to 6a illustrate a method of manufacturing the optical plate according to an exemplary embodiment of the present invention.
Figure 6B:
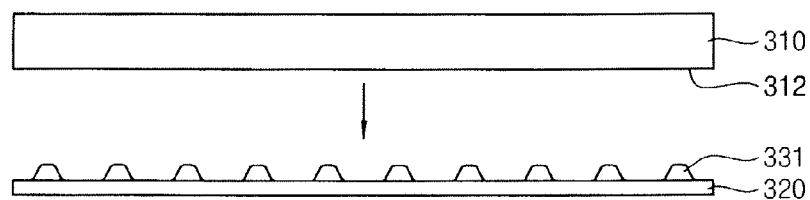

As shown in FIG. 6a, ink 110 is jetted on the base film 320 through an inkjet nozzle 100 to form the light collecting patterns 331. The ink 110 comprises a UV curing resin, and may further comprise a solvent. The UV curing resin is liquefied to be jetted on the base film 320.

As the light collecting patterns 331 are formed through the inkjet method, an additional patterning process is not required.

A transverse section of the light collecting patterns 331 may vary depending on the wetting property of the ink 110 for the base film 320 and viscosity of the ink 110.

As shown in FIG. 6b, the light guiding plate 310 is disposed over the base film 320 and comes close to the base film 320.

Figure 6C:
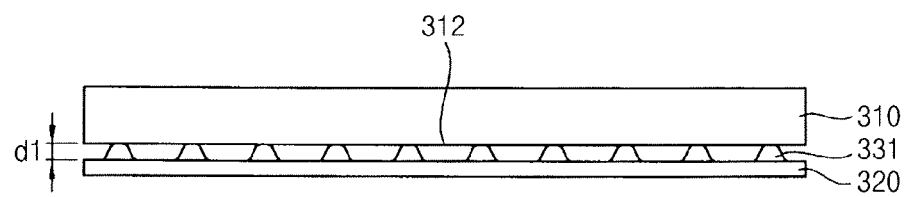

FIG. 6c illustrates the emission surface 312 of the light guiding plate 310, when it contacts with the light collecting patterns 331. To shape the transverse section of the light collecting patterns 331, a distance d1 between the light guiding plate 310 to the base film 320 and wetting property of the ink 110 for the light guiding plate 310 may be adjusted. A degree of wetting of the ink 110 for the light guiding plate 310 is preferably but not necessarily lower than that for the base film 320.

Here, the light guiding plate 310 is disposed on the base film 320. Thus, the light collecting patterns 331 have a larger contact area with the base film 320 than that with the light guiding plate 310 due to gravity.

Figure 6D:
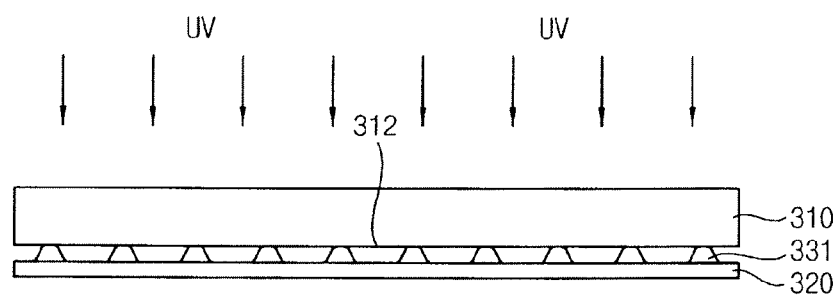

As shown in FIG. 6d, the light collecting patterns 331 is cured with ultraviolet rays, thereby completing the optical plate 30. The light collecting patterns 331 are cured while maintaining its shape. The light guiding plate 310 is adhered to the base film 320 by the cured light collecting patterns 331.

Figure 7:
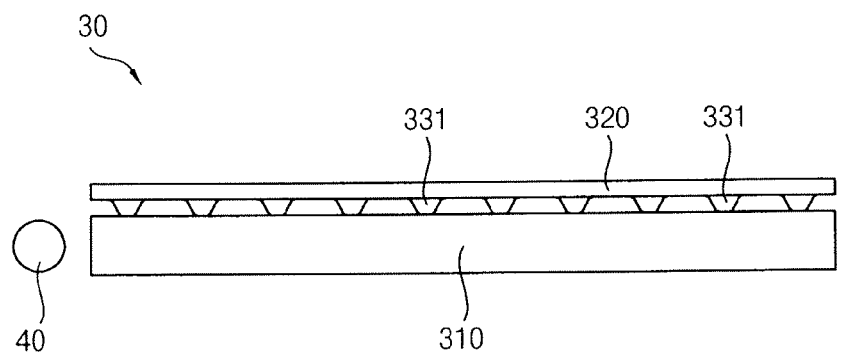
FIG. 7 is a sectional view of an optical plate according to an exemplary embodiment of the present invention.

FIG. 7 is a sectional view of an optical plate according to a second exemplary embodiment of the present invention.

In the second exemplary embodiment, a light source 40 is provided on a lateral side of a light guiding plate 310 of a plate type. A light collecting pattern 331 becomes dense as it is far from the light source 40. When the light source 40 is provided on the lateral side of the light guiding plate 310 alone, brightness may be lowered in an emission surface 312 which is far from the light source 40. In the second exemplary embodiment, the brightness distribution may be uniform by adjusting intervals of the light collecting patterns 331.

When the light source 40 is disposed on the lateral side of the light guiding plate 310 alone, the light guiding plate 310 may have a wedge type, not the plate type.

In the foregoing exemplary embodiments, the light collecting patterns 331 comprise a plurality of stripe patterns, but are not limited thereto. Other patterns of the light collecting patterns 331 will be described in third and fourth exemplary embodiments of the present invention.

Figure 8:
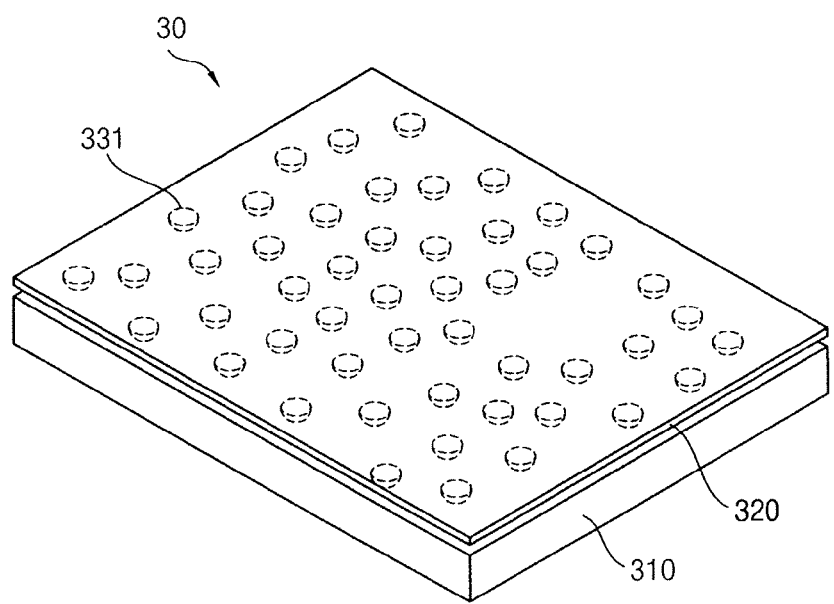
FIGS. 8 and 9 are perspective views of an optical plate according to exemplary embodiments of the present invention.
Figure 9:
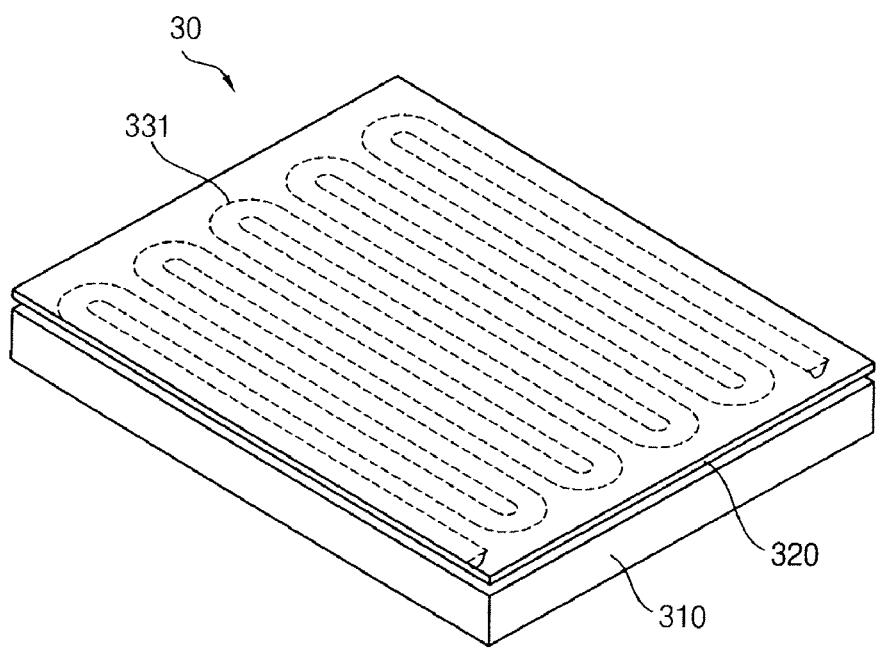

FIGS. 8 and 9 are perspective views of optical plates according to third and fourth exemplary embodiments of the present invention, respectively.

As shown in FIG. 8, a light collecting pattern 331 according to the third exemplary embodiment has a dot shape. The light collecting pattern 331 according to the third exemplary embodiment shows a light collecting effect in both x and y directions in FIG. 5a.

As shown in FIG. 9, light collecting patterns 331 according to the fourth exemplary embodiment of the present invention are connected with each other. An inkjet nozzle 100 continuously jets ink 110 to form the light collecting patterns 331 according to the fourth exemplary embodiment of the present invention. This may prevent the inkjet nozzle 100 from being clogged by the ink 110 due to discontinuance of the ink jetting.

The exemplary embodiments of the present invention provide a manufacturing method of an optical plate which guides and collects light at the same time.

Also, the exemplary embodiments of the present invention provide an optical plate which guides and collects light at the same and a liquid crystal display device comprising the same.

Having described the exemplary embodiments of the present invention, it is further noted that it is readily apparent to those of reasonable skill in the art that various modifications may be made without departing from the spirit and scope of the invention which is defined by the metes and bounds of the appended claims.

What is claimed is:

1. A method of manufacturing an optical plate, comprising:
    forming a protrusion on a base film;
    contacting a light guiding plate to the protrusion formed on the base film; and
    curing the protrusion in a state where the light guiding plate is in contact with the protrusion formed on the base film, so that the cured protrusion attaches the base film to the light guiding plate,
    wherein the base film, the cured protrusion and the light guiding plate indivisibly bond together without an additional adhesive.

2. The method according to claim 1, wherein the protrusion comprises a light collecting pattern.

3. The method according to claim 2, wherein the protrusion is formed by jetting ink containing a liquid resin,
    wherein the liquid resin comprises an ultraviolet (UV) curing resin, and wherein the light collecting pattern is cured by ultraviolet rays.

4. The method according to claim 2, wherein the light collecting pattern has a stripe shape.

5. The method according to claim 4, wherein the light collecting pattern is provided to be plural in number, the plurality of light collecting patterns being disposed in parallel with each other.

6. The method according to claim 4, wherein the cured light collecting pattern has a larger contact area with the base film than that with the light guiding plate.

7. The method according to claim 6, wherein the base film comprises a plurality of light diffusing beads.

8. The method according to claim 7, wherein the base film further includes a base resin part formed of one of a polycarbonate resin or a poly vinyl chloride resin, and wherein the light diffusing beads comprise a material which has a refractive index different from a refractive index of the base resin part.

9. The method according to claim 8, wherein the light diffusing beads comprise polyethyleneterephthalate (PET).

10. The method according to claim 2, wherein the light collecting pattern is provided as a dot pattern.

11. An optical plate comprising:
    a light guiding plate;
    a base film which is located on the light guiding plate; and
    a light collecting pattern disposed between the base film and the light guiding plate, the light collecting pattern being in direct contact with both the base film and the light guiding plate to attach the base film to the light guiding plate,
    wherein the base film, the light collecting pattern and the light guiding plate indivisibly bond together without an additional adhesive.

12. The optical plate according to claim 11, wherein the light collecting pattern comprises an ultraviolet (UV) curing resin,
    wherein the light collecting pattern is cured in a state where the light guiding plate contacts with the light collecting pattern formed on the base film and attaches the base film to the light guiding plate without an additional adhesive.

13. The optical plate according to claim 11, wherein the base film comprises a plurality of light diffusing beads.

14. The optical plate according to claim 13, wherein the base film further includes a base resin part formed of one of a polycarbonate resin or a poly vinyl chloride resin, and wherein the light diffusing beads comprise a material which has a refractive index different from a refractive index of the base resin part.

15. The optical plate according to claim 14, wherein the light diffusing beads comprise polyethyleneterephthalate (PET).

16. A liquid crystal display device, comprising:
a liquid crystal display panel;
an optical plate which is provided in rear of the liquid crystal display panel, the optical plate comprises a light guiding plate, a base film provided on the light guiding plate and a light collecting pattern disposed between the base film and the light guiding plate, the light collecting pattern being in direct contact with both the base film and the light guiding plate to attach the base film to the light guiding plate; and
a light source which is provided on at least a lateral side of the light guiding plate,
wherein the base film, the light collecting pattern and the light guiding plate indivisibly bond together without an additional adhesive.

17. The liquid crystal display device according to claim 16, wherein the light collecting pattern has a larger contact area with the base film than that with the light guiding plate.

18. The liquid crystal display device according to claim 16, wherein the light collecting pattern is of a stripe type and is provided to be plural in number, the plurality of light collecting patterns being in parallel with each other.

19. The liquid crystal display device according to claim 18, wherein the light source is disposed in parallel with an extension direction of the light collecting pattern.

20. The liquid crystal display device according to claim 16, wherein the light collecting pattern comprises an ultraviolet (UV) curing resin,
wherein the light collecting pattern is cured in a state where the light guiding plate contacts with the light collecting pattern formed on the base film and attaches the base film to the light guiding plate without an additional adhesive.

21. The liquid crystal display according to claim 16, wherein the base film comprises a plurality of light diffusing beads.

22. The liquid crystal display according to claim 21, wherein the base film further includes a base resin part formed of one of a polycarbonate resin or a poly vinyl chloride resin, and wherein the light diffusing beads comprise a material which has a refractive index different from a refractive index of the base resin part.

23. The liquid crystal display according to claim 22, wherein the light diffusing beads comprise polyethyleneterephthalate (PET).

* * * * *